United States Patent
Petrina et al.

(10) Patent No.: US 12,187,093 B1
(45) Date of Patent: Jan. 7, 2025

(54) CONTROL ARM AND ADJUSTABLE BALL JOINT

(71) Applicant: RB Distribution, Inc., Colmar, PA (US)

(72) Inventors: Jonathan Petrina, Glenside, PA (US); Thomas Reiff, Portage, MI (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/341,837

(22) Filed: Jun. 27, 2023

(51) Int. Cl.
*B60G 7/00* (2006.01)
*F16C 11/06* (2006.01)
*B62D 17/00* (2006.01)

(52) U.S. Cl.
CPC ............ *B60G 7/005* (2013.01); *B60G 7/001* (2013.01); *F16C 11/0619* (2013.01); *B60G 2200/156* (2013.01); *B60G 2204/416* (2013.01); *B60G 2204/61* (2013.01); *B60G 2206/16* (2013.01); *B62D 17/00* (2013.01)

(58) Field of Classification Search
CPC ...... F16C 11/06; F16C 11/0619; B62D 17/00; B60G 7/001; B60G 7/005; B60G 2204/156; B60G 2204/16; B60G 2204/416
See application file for complete search history.

(56) References Cited

U.S. PATENT DOCUMENTS

| | | | | |
|---|---|---|---|---|
| 2,900,196 | A * | 8/1959 | Nienke | B60G 7/005 403/77 |
| 6,293,724 | B1 * | 9/2001 | Spears | B60G 7/005 280/86.756 |
| 6,478,318 | B1 * | 11/2002 | Allman | B60G 7/008 280/86.754 |
| 6,557,872 | B1 * | 5/2003 | Garrard | B60G 3/265 280/86.754 |
| 7,513,514 | B1 * | 4/2009 | Schlosser | B62D 17/00 280/86.756 |
| 8,544,861 | B2 | 10/2013 | Frens | |
| 8,925,944 | B2 | 1/2015 | Byrnes | |
| 9,327,570 | B2 | 5/2016 | Karpman et al. | |
| 9,751,370 | B2 | 9/2017 | Weifenbach et al. | |
| 10,155,424 | B1 | 12/2018 | Elterman | |
| 10,450,005 | B2 | 10/2019 | Weifenbach et al. | |
| 10,814,535 | B2 | 10/2020 | Lee et al. | |
| 10,953,577 | B2 | 3/2021 | Lee et al. | |
| 11,131,337 | B1 * | 9/2021 | Miller | F16C 11/0604 |
| 11,241,928 | B2 | 2/2022 | Kim et al. | |
| 11,491,837 | B2 | 11/2022 | Kim et al. | |
| 11,499,589 | B2 | 11/2022 | Miller et al. | |

* cited by examiner

Primary Examiner — James A English
(74) Attorney, Agent, or Firm — Volpe Koenig (57) ABSTRACT

A ball joint assembly for control arm. The ball joint assembly has an upper portion with a ball socket and stud centered about a first centerline. A radial extension that is connected to the upper portion supports a mounting body with a second centerline and an outer diameter that fits within an aperture in the control arm. A threaded shaft depends from the mounting body and receives a nut to tighten against the control arm until the first centerline of the ball joint assembly is fixed in a desired position.

4 Claims, 8 Drawing Sheets

CONTROL ARM AND ADJUSTABLE BALL JOINT

BACKGROUND

Control arms have been are an important component of a vehicle's suspension since the advent of multi-component suspensions. Control arms allow up and down movement of the suspension while securing the steering knuckles, spindles, and axles to the vehicle and in proper alignment. Control arms have undergone many changes as a result of automotive design and manufacturing technology Most modern control arms are designed to permit adjustments to the vertical alignment or camber of the vehicle's wheels. Camber can be negative, the top of the wheel is tilted in, or positive, the top of the wheel is tilted out. Proper adjustment of camber can be major concern in damage repairs, racing, and the lowering or lifting a vehicle from a stock position.

When one of these conditions arises, the issue is often addressed by installing adjustable control arms to correct the vehicle's camber. However, many of these solutions require the purchase of a particular control arm that addresses the specific, identified problem. This results in there being multiple replacement control arms, which can create supply and inventory problems.

SUMMARY

The disclosed control arm assembly has a control arm frame that mounts to a vehicle and includes an aperture that receives a ball joint assembly. The ball joint assembly has a carrier with a ball joint stud on one vertical axis and a housing with a dependent threaded shaft that is on a second vertical axis. The ball joint assembly is rotatable in the frame aperture for 360 degrees about the second vertical axis. The ball joint assembly is fixed in a desired position by tightening the assembly against the control arm frame.

DETAILED DESCRIPTION

The control arm assembly will be described in more detail with reference to the drawing figures wherein the same numeral identifies the same or similar element throughout.

Figure 1:
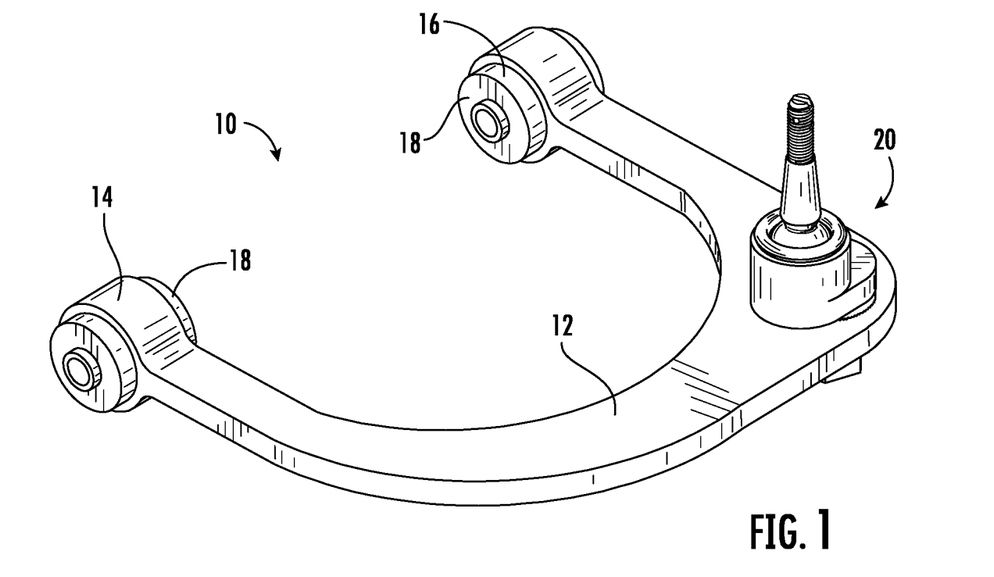
FIG. 1 is a perspective view of an adjustable control arm assembly with a ball joint assembly.

With reference to FIG. 1, the control arm assembly 10 has a frame member 12, which is illustrated in a general sense with the understanding that the frame member 12 will be configured to the particular vehicle. The free ends 14 and 16 of the frame 12 will have bearing 18 for mounting the control arm 10 to the particular vehicle. The frame 12 will have an aperture, see FIG. 3, for locating a ball joint assembly 20.

Figure 2:
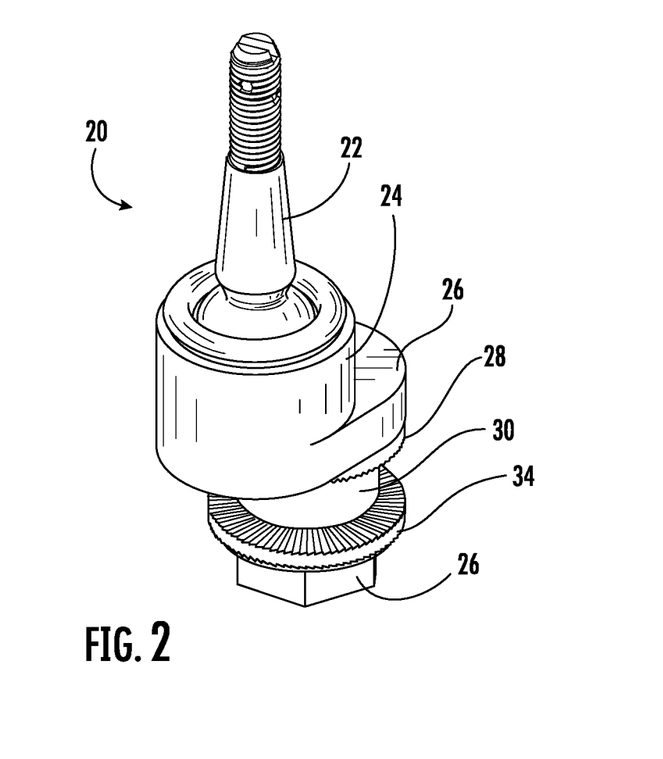
FIG. 2 is a perspective view of just the ball joint assembly.

With reference to FIG. 2, The ball joint assembly includes a ball and stud 22, a ball cup 24, an extended base 26 to the ball cup 24, a first washer 26, a mount 30 for insertion in the frame aperture, a threaded stud 32, a second washer 34, and a fastener 36.

Figure 3:
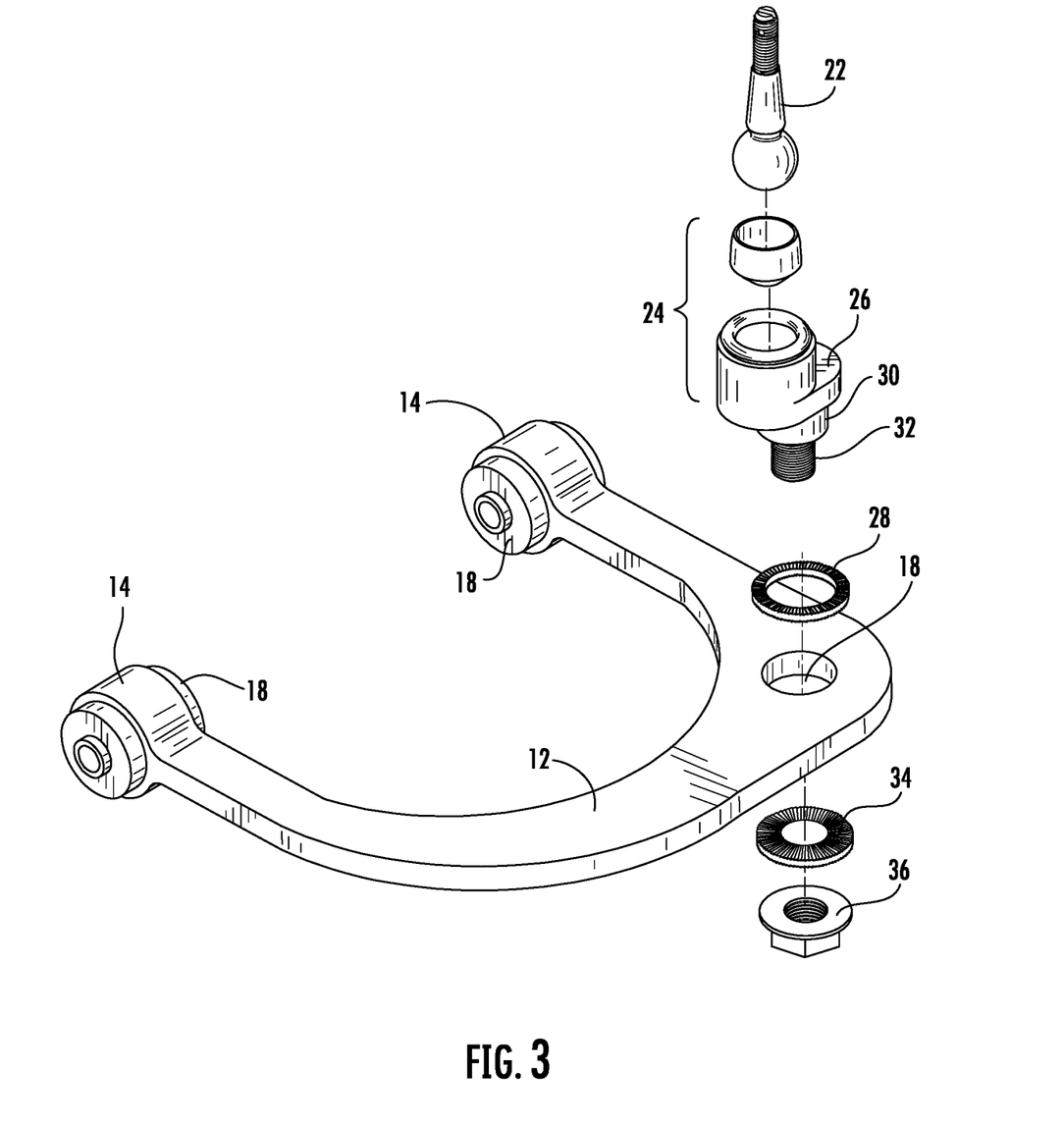
FIG. 3 is an exploded view of the adjustable control arm assembly with a ball joint assembly in FIG. 1.
Figure 4:
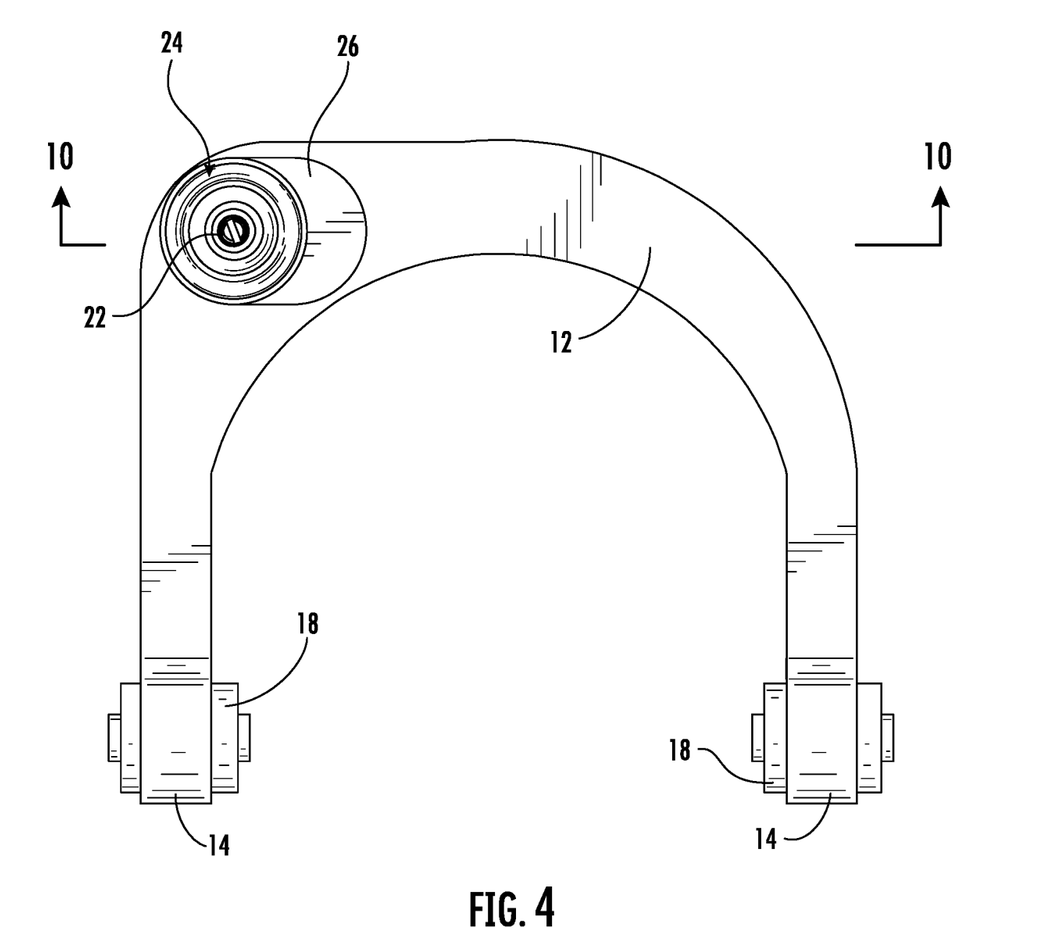
FIG. 4 is a top plan view of the adjustable control arm assembly with a ball joint assembly in FIG. 1.
Figure 5:
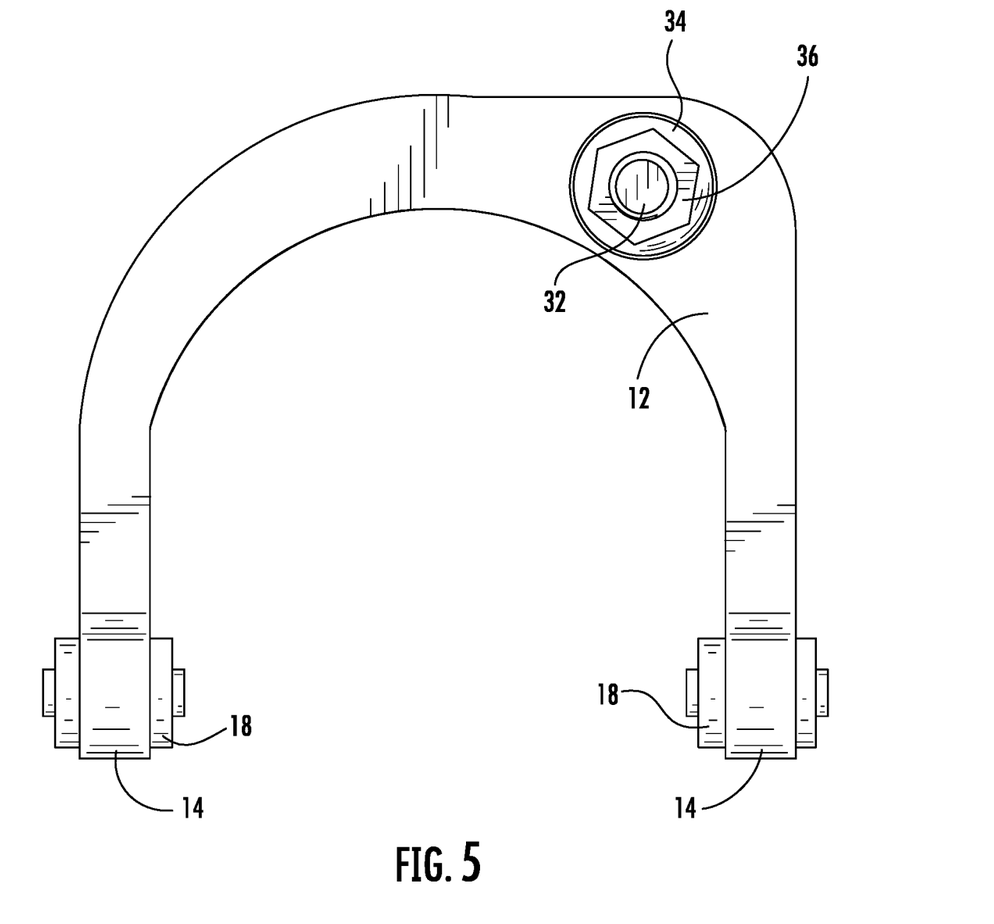
FIG. 5 is bottom plan view of the adjustable control arm assembly with a ball joint assembly in FIG. 1.
Figure 6:
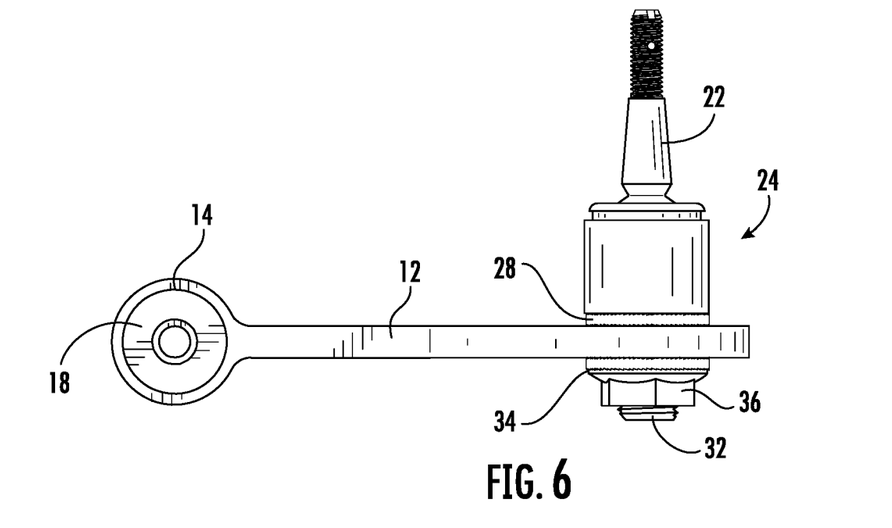
FIG. 6 is a left side elevation of the adjustable control arm assembly with a ball joint assembly in FIG. 1.
Figure 7:
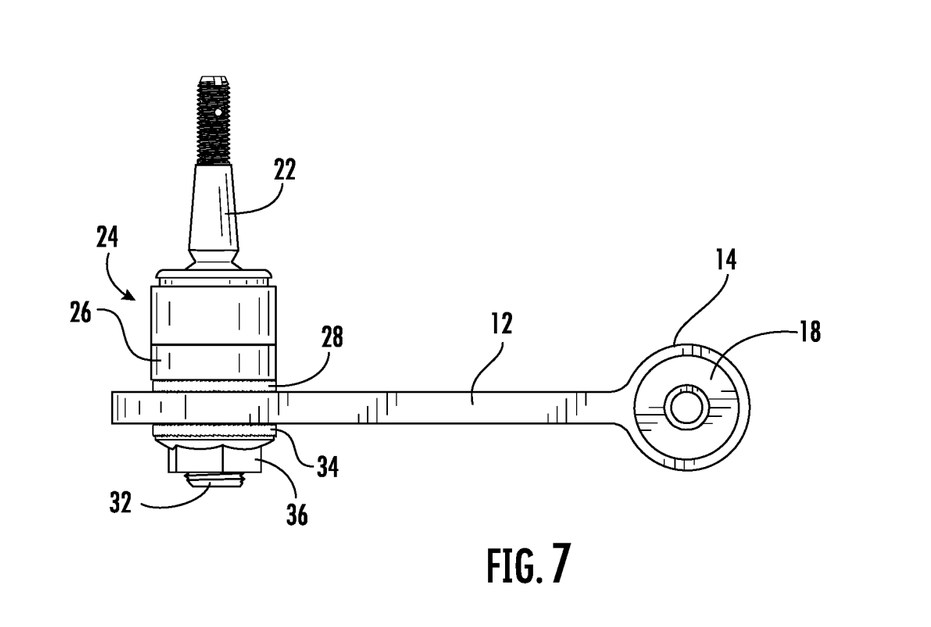
FIG. 7 is a right side elevation of the adjustable control arm assembly with a ball joint assembly in FIG. 1.
Figure 8:
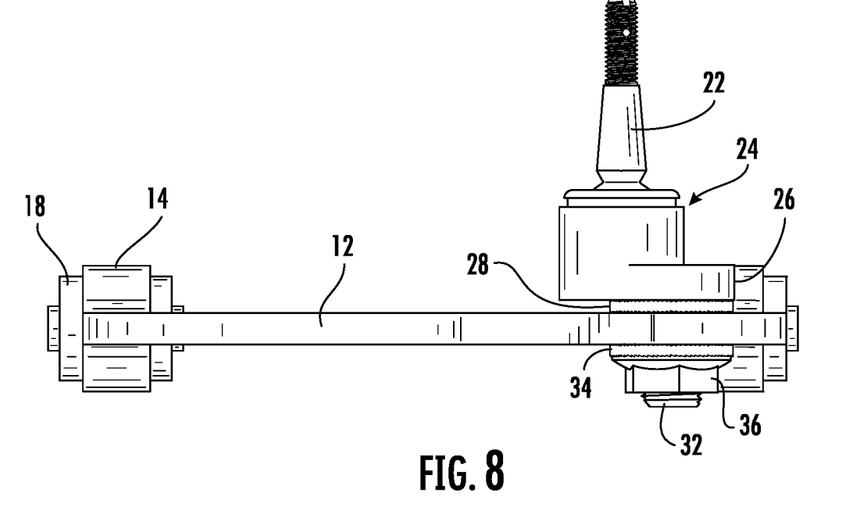
FIG. 8 is a front elevation of the adjustable control arm assembly with a ball joint assembly in FIG. 1.
Figure 9:
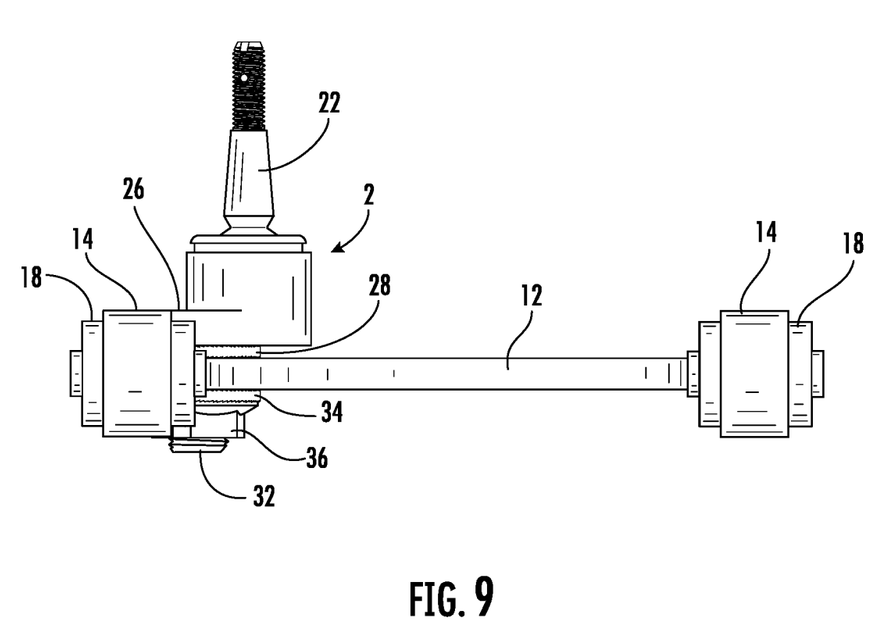
FIG. 9 is a rear elevation of the adjustable control arm assembly with a ball joint assembly in FIG. 1.
Figure 10:
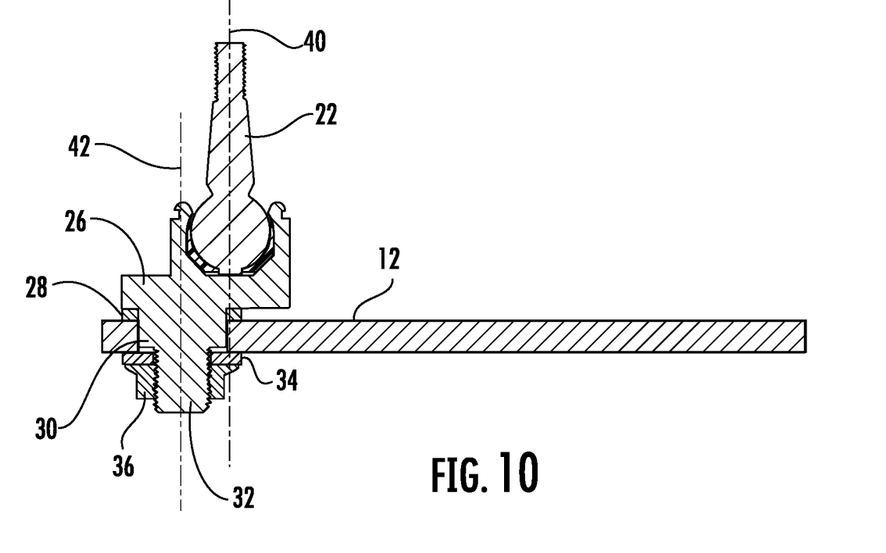
FIG. 10 is a section along the line 10-10 in FIG. 4.
Figure 11:
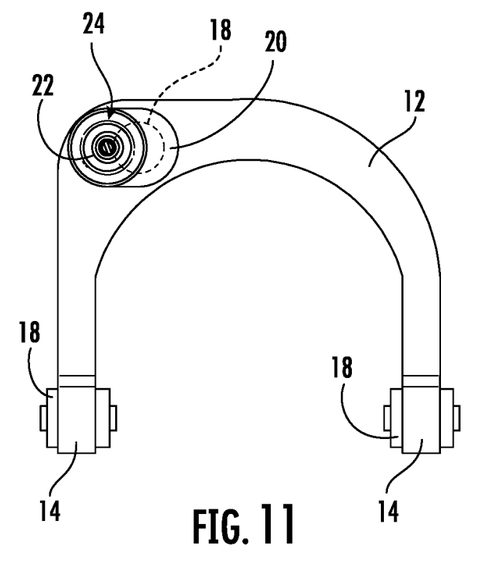
FIGS. 11 through 14 illustrate various positions achievable by rotation of the ball joint assembly within the control arm.
Figure 12:
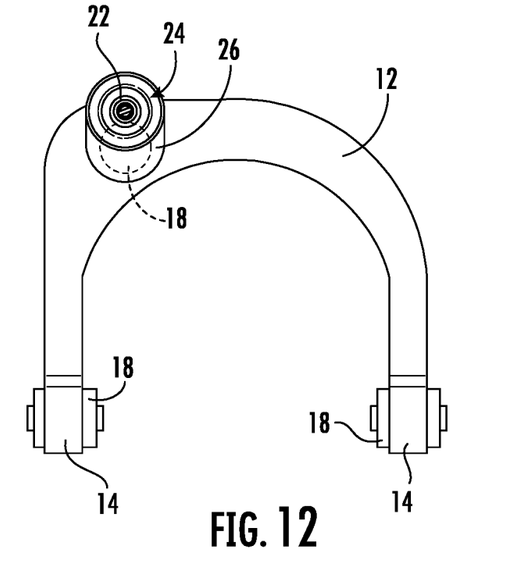
Figure 13:
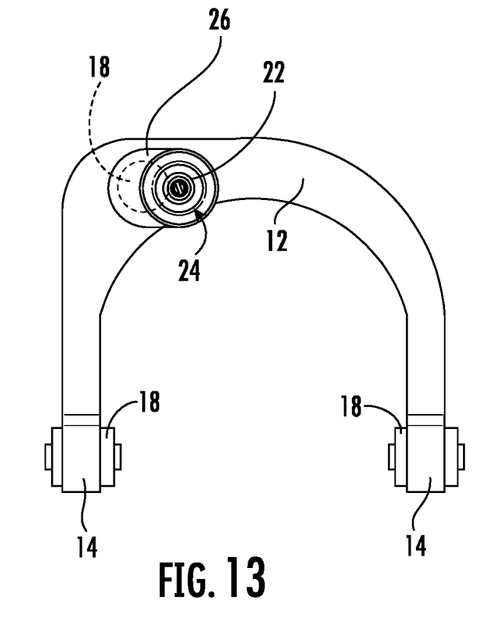
Figure 14:
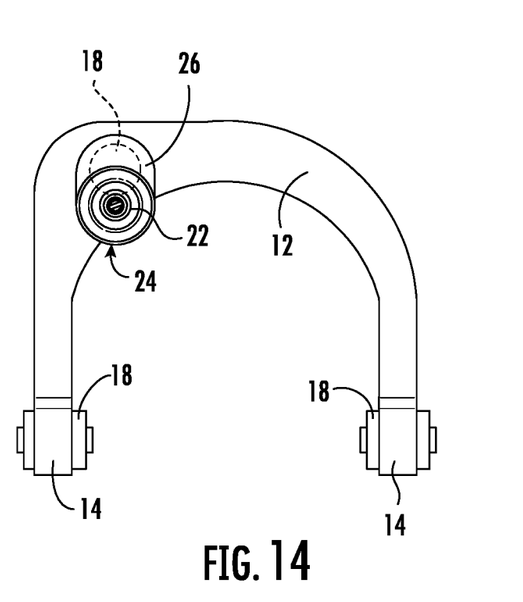

With reference to FIGS. 3, 4, and 10, it can be seen that the mount 30 depends from the cup base 26. The mount 30 has a diameter that is selected to be less than the diameter of the aperture 18 so that the base 30 fits within the diameter of the aperture 18 and be rotatable. The washer 28 has an inner diameter that fits around the mount 30 and an outer diameter that abuts the extended base 26 to the ball cup 24. When the mount 30 is inserted in the aperture 18, the stud 32 extends beyond the frame 12 to receive a second washer 24 and the fastener.

FIGS. 10 through 14 illustrate rotation of the ball and stud 22 with respect to the aperture 18 in the frame 12. As illustrated in FIG. 10, the ball and stud 22 are centered about the center line 40 and the mount 30 is centered about the centerline 42, which is a common centerline with the aperture 18 in frame 12. As illustrated in FIG. 11 through 14, the position of the ball and stud 30 can be varied until the desired location is achieved and locked in place by tightening the fastener 36. The position of the ball and stud 22 can be varied through 360 degrees by rotating the mount 30 about the centerline 42 within the aperture 18 and it is not limited to the positions illustrated in FIGS. 11 through 14. Once the ball and stud 22 are located in the desired position for connection to an associated frame member, the fastener 36 is tightened to fit the ball joint assembly in position. As illustrated, the washer 28 and 34 have irregular surfaces, such as redial grooves, that enhance their grip with the extended base 26 and frame 12 when the fastener 36 is tightened to fix the position of ball and stud 22.

What is claimed is:

1. A vehicle control arm assembly comprising:
   a frame configured for mounting to a vehicle with an aperture having a predetermined diameter; and,
   a ball joint assembly having:
   a ball joint and stud that are centered about a first centerline and mounted in a ball joint cup that includes a radial extension that supports a mounting body;
   the mounting body is centered on a second centerline and has an outer diameter that complements the predetermined diameter of the aperture in the frame and a threaded stud;
   a first lock washer with an aperture that is at least at least equal to the diameter of the mounting body;
   a second lock washer with an aperture that receives the threaded stud of the mounting body; and,
   an internally threaded closure that complements the threaded stud;
   whereby the ball joint assembly is fixed to the frame by positioning the first centerline of the ball joint and the stud at a desired position and tightening the first lock washer on one surface of the frame and the second lock washer against on an opposite surface of the frame.

2. A control arm assembly comprising:

a frame having free ends configured for mounting to a vehicle and an elongated portion that includes an aperture with a first diameter; and, a ball joint assembly having:

an upper portion with a ball socket and stud centered about a first centerline;

a radial extension that is connected to the upper portion and supports a mounting body with an outer diameter that fits with the frame aperture;

a threaded shaft that depends from the mounting body and extends beyond the frame; and, at least two lock washers;

whereby the ball joint assembly is attached to the frame by placing one of the at least two lock washers on each surface of the frame and tightening a fastener on the threaded shaft until the radial extension is in fixed contact with the frame.

3. A ball joint assembly for control arm configured for mounting to a vehicle and an elongated portion that includes an aperture with a predetermined diameter, the ball joint assembly comprising:

an upper portion with a ball socket and stud centered about a first centerline;

a radial extension that is connected to the upper portion and supports a mounting body with a second centerline and an outer diameter that fits within an aperture having a predetermined diameter; and, a threaded shaft that depends from the mounting body;

whereby the ball joint assembly is attached to a frame by placing at least one lock washer on an opposite surfaces of the frame and tightening a nut on the threaded shaft until the first centerline is fixed in a desired position.

4. A kit for assembling an adjustable vehicle control arm, the kit comprising:

a control arm frame that is configured for mounting to a vehicle and has an aperture with a predetermined diameter; and, a ball joint assembly having:

a ball joint and stud that are centered about a first centerline and mounted in a ball joint cup that includes a radial extension that supports a mounting body;

the mounting body is centered on a second centerline and has an outer diameter that complements the frame aperture with a predetermined diameter a threaded stud;

a first washer with an aperture that is at least at least equal to the outer diameter of the mounting body;

a second washer with an aperture that receives the threaded stud of the mounting body; and, an internally threaded closure that complements the threaded shaft;

whereby the ball joint assembly is fixed to the control arm frame by positioning the ball joint and stud at a desired position and tightening the fastener to engage the first washer and the second washer against opposite surfaces of the of the control arm frame.

\* \* \* \* \*